No. 774,402. PATENTED NOV. 8, 1904.
F. F. SWAIN.
METALLIC PACKING.
APPLICATION FILED NOV. 20, 1903.
NO MODEL.
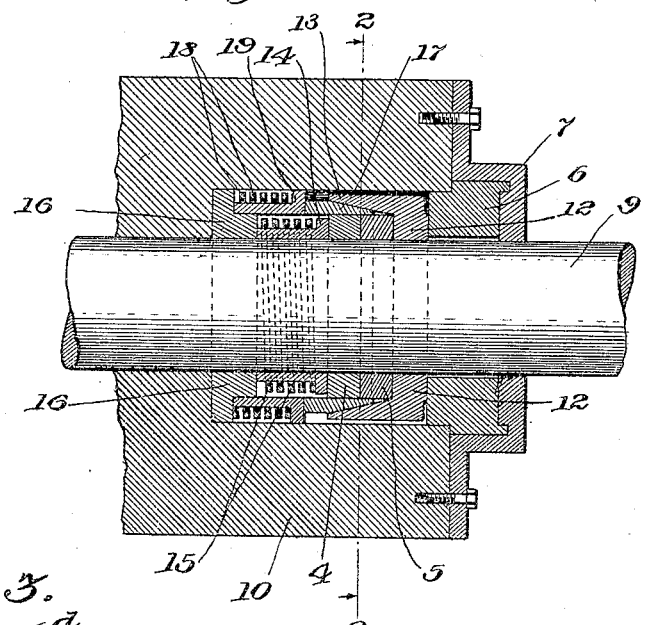
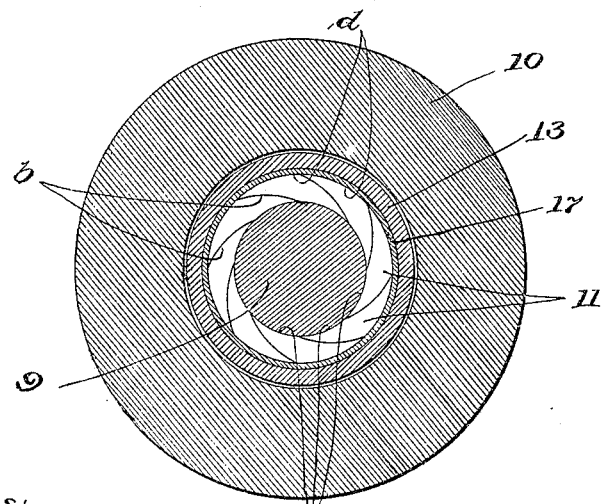
Witnesses:
M. J. McPike
Robert H. Weir
Inventor
Frederick F. Swain
By Brown & Darby
Attys.

No. 774,402. Patented November 8, 1904.

UNITED STATES PATENT OFFICE.

FREDERICK F. SWAIN, OF CHICAGO, ILLINOIS.

METALLIC PACKING.

SPECIFICATION forming part of Letters Patent No. 774,402, dated November 8, 1904.

Application filed November 20, 1903. Serial No. 181,920. (No model.)

*To all whom it may concern:*

Be it known that I, FREDERICK F. SWAIN, a citizen of the United States, residing at Chicago, in the county of Cook and State of Illinois, have invented a new and useful Metallic Packing, of which the following is a specification.

This invention relates to metallic packing. The object of the invention is to provide a metallic packing which is simple and efficient and economical in manufacture.

A further object of the invention is to provide a metallic packing in which the packing ring or rings are made up of sections held together in concentric relation with respect to the shaft or piston-rod to which the packing is to be applied and constantly maintained in such concentric relation to compensate for any wear on the packing ring or rings or sections thereof that may occur during the operation of the shaft or piston-rod.

A further object of the invention is to provide means which are simple and efficient for maintaining the concentric relation of the sectional packing ring or rings.

Other objects of the invention will appear more fully hereinafter.

The invention consists, substantially, in the construction, combination, location, and arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a broken view, in central longitudinal section, of a metallic packing and box as applied to a piston-rod or shaft and embodying the principles of my invention. Fig. 2 is a view in transverse section on the line 2 2 of Fig. 1 looking in the direction of the arrows. Fig. 3 is a detached detail view in perspective of a portion of a sectional packing-ring embodying the principles of my invention.

The same part is designated by the same reference-sign wherever it occurs throughout the several views.

In the drawings reference-sign 9 designates the shaft or piston-rod to which the packing is to be applied.

10 designates the box or casing which incloses the packing and which box or casing is provided, in the usual way, with a bore or recess in which the packing is received.

6 designates a gland or face ring suitably shouldered, the reduced portion thereof being received in the open end of the recess or cavity in the box or casing 10, so as to maintain the parts of the packing within such recess or cavity, said gland or face ring being held and clamped in place with the shoulder thereon bearing against the outer face of the box or casing 10 in any convenient manner—as, for instance, by means of the follower-plate 7.

Reference-numerals 4 and 5 (see Fig. 1) designate the packing-rings placed in encircling relation upon the shaft or rod 9. Each of these rings is composed of a series of sections 11, Figs. 2 and 3, these sections being of peculiar formation, as clearly indicated in Fig. 3. Each section is provided with a curved bearing-surface $a$, the curvature of which is on the same radius as the radius of the piston-rod or shaft 9 and constitutes the bearing of such section upon said shaft or rod, and which section 11 of the packing-ring is provided with a tapering end portion, the inner surface $b$ of which is also on a curve struck from a radius equal to the curve of the radius $a$, but from a different center, said surface receiving the outer correspondingly-curved surface $c$ of the next adjacent section. The exterior surface $d$ of each section is also curved, being struck from a center concentric with the axis of the shaft or rod 9. Thus it will be seen that each section composing the packing-ring is in the form of a block or piece having four curved surfaces—the inner curved surfaces $a$ and $b$ and the outer curved surfaces $c$ and $d$—the inner curved surface $a$ forming the basis of the section or part against the periphery or peripheral surface of the rod or shaft 9 and being curved with a radius corresponding to the radius of the rod or piston and struck from a center concentric with the axis of said rod or piston, the curved surface $b$ being struck from an equal radius, but from a different center and bearing upon the similarly-curved surface c of the next adjacent section in the ring, and the outer curved surface d being struck from a point concentric with the axis of shaft or rod 9, but of greater radius, so that when the sections are assembled to form a ring a truly concentric inner surface is presented by the several curved surfaces a of the sections and which form the contacting surfaces of the sections with the rod or shaft, and a truly concentric exterior surface is formed of the various surfaces d of the sections, while each section is permitted to automatically slide upon its next adjacent section without destroying the concentricity of the surfaces a and d with respect to each other and with reference to the shaft or rod 9. By this construction it will be seen that any wear on the sections composing the packing-ring is automatically compensated for, the sections automatically adjusting themselves in true concentric relation with respect to the shaft or rod, while at the same time constantly maintaining an efficient packing-bearing upon said shaft.

While I have described one specific form of a sectional packing-ring wherein the sections automatically accommodate themselves with reference to each other and to the shaft or rod to which they are applied and to compensate for wear, I do not desire to be limited or restricted to the specific construction shown, as many variations therefrom and changes in the details of construction thereof would readily occur to persons skilled in the art and still fall within the spirit and scope of my invention.

In a practical application of my invention I employ one or more rings 4 5, (see Fig. 1,) each ring composed of sections 11, assembled, as above described, in encircling relation with respect to the shaft or rod 9, to which the packing is applied, and within the cavity or recess in the box or casing 10.

12 designates a plate sleeved upon the shaft or rod 9 and provided with an annular interiorly tapering or beveled flange 13, arranged to inclose the ring or rings 4 5, one of said rings, as ring 5, being arranged to bear laterally against the inner surface of plate 12. Any suitable or convenient means may be employed for constantly pressing the rings 4 5 toward the lateral bearing of said rings against each other and the outermost of said rings against the inner surface of plate 12. I have shown a simple and convenient arrangement wherein I employ a shouldered ring 14, sleeved upon shaft or rod 9, and a spring 15, bearing at one end against the inner wall of the cavity or recess in box or casing 10 or, as shown, against a part 16, arranged therein, and at the other end said spring bearing against the shoulder of sleeve 14 and tending to force said ring laterally against the packing-ring 4, thus constantly crowding said packing-ring 4 laterally against packing-ring 5 and the latter against the inner wall or surface of plate 12, thus maintaining a tight joint between the packing-rings and also between the outer packing-ring 5 and plate 12. Any suitable or convenient means may be employed for maintaining the sections of the packing-rings in efficient concentric relation with respect to the shaft or rod 9 and tending to constantly adjust the sections of the packing-rings with reference to such concentricity and to compensate for any wear upon said sections. I have shown a simple arrangement for accomplishing this purpose, but to which I do not desire to be limited or restricted, wherein a cylindrical sleeve 17 is arranged within the recess or cavity in box or casing 10 in encircling relation with respect to the packing-rings 4 5 and having an exterior outwardly-tapering surface coöperating with the interior tapering surface of flange 13 of plate 12, so that by constantly pressing the encircling ring 17 outwardly by reason of the coöperating beveled or tapering exterior surface of the encircling ring 17 and the correspondingly interiorly tapered or beveled surface of flange 13 the packing-rings are efficiently maintained in assembled encircling relation with respect to each other and to the shaft or rod 9, and the sections of said packing-rings are efficiently adjusted relatively to each other to compensate for wear and be constantly pressed against and in bearing contact with the peripheral surface of the shaft or rod 9. The encircling ring 17 may be yieldingly pressed or telescoped into or within the flange 13 in any convenient manner—as, for instance, by means of a spring 18 bearing at one end against the inner wall of the recess or cavity in box or casing 10 or against the part 16 placed thereon and at its outer end bearing against a shoulder formed on a ring 19, which ring bears against the encircling ring 17, as clearly shown.

From the foregoing description it will be seen that I provide an exceedingly simple and efficient means for maintaining the packing-rings in assembled relation and in encircling relation with respect to the shaft or rod to which said packing-rings are applied and the sections of said packing-rings so maintained as to be self-adjusting to compensate for any wear that may occur thereon and with tight joints between the sections of the packing-rings and between the packing-rings themselves and between the packing-rings and the plate 12.

I do not desire to be limited or restricted, however, to the specific means shown and described for maintaining the packing-rings in assembled relation nor to the means employed for maintaining the sections of the packing-rings assembled and constantly pressed into bearing contact with the rod or shaft to which the packing-rings are to be applied.

A packing such as above described and embodying the principles of my invention is especially adapted for use in locomotive and marine-engine service, but is equally well adapted for high-speed horizontal or vertical engines and can be usefully applied in almost any situation where metallic packing is required.

Having now set forth the object and nature of my invention and a construction embodying the principles thereof, what I claim as new and useful and of my own invention, and desire to secure by Letters Patent, is—

1. In a metallic packing, the combination with a shaft or rod, of a packing-ring mounted thereon and composed of sections, each section having an exterior curved surface, an interior curved surface, and an interior and an exterior curved lapping surface, all of said curved surfaces having a radius of curvature equal to the radius of the shaft or rod to which said ring is to be applied, and means operating to maintain said sections in assembled relation, as and for the purpose set forth.

2. A metallic packing-ring composed of sections, each section having a curved surface concentric with and adapted to be applied to the shaft or rod and curved lapping surfaces to engage concentrically-curved surfaces on adjacent sections, and means for maintaining said sections in lapped and assembled relation concentric with the shaft or rod, as and for the purpose set forth.

3. A metallic packing-ring composed of sections, each section having a curved surface at each end thereof to form a bearing for correspondingly-curved surfaces of the next adjacent section when said sections are assembled, the curvature of said surfaces being of equal radius, and means for maintaining said sections in assembled relation to encircle the shaft or rod to which the ring is to be applied, as and for the purpose set forth.

4. A metallic packing-ring composed of sections, said sections being lapped upon each other, the lapping surfaces of said sections being curved upon a radius equal to the radius of the shaft or rod to which the ring is to be applied, and means for maintaining said sections in assembled relation to encircle the shaft or rod, as and for the purpose set forth.

5. In a metallic packing, the combination with a rod or shaft, of a packing-ring arranged thereon in encircling relation with respect thereto, and composed of sections, said sections lapping upon each other, the lapping surfaces of said sections being correspondingly curved upon a radius equal to the radius of said shaft or rod, and means for constantly maintaining said sections in encircling relation with respect to the shaft or rod to compensate for wear, as and for the purpose set forth.

6. In a metallic packing, the combination with a shaft or rod, of a packing-ring mounted thereon in concentric relation with respect thereto, said packing-ring composed of sections, said sections lapping upon each other, the lapping surfaces thereof being concentrically curved, upon a radius equal to the radius of the shaft or rod, whereby said sections automatically adjust themselves to compensate for wear, and means for maintaining said sections in assembled relation, as and for the purpose set forth.

7. In a metallic packing, the combination with a shaft or rod, of a packing-ring mounted thereon and composed of sections, said sections provided with curved surfaces lapping upon each other, whereby they automatically adjust themselves to compensate for wear, and each formed with an exterior curved surface concentric with the axis of the shaft or rod, all of said curved surfaces having an equal radius of curvature, and means engaging said exterior surface and operating to normally maintain the same in assembled relation and to constantly press the same into encircling bearing contact with the shaft or rod, as and for the purpose set forth.

8. In a metallic packing, the combination with a shaft or rod, of a packing-ring including sections lapped upon each other, the lapping surfaces of said sections being curved concentric with each other, the radius of curvature of said curved lapping surfaces being equal to the radius of curvature of the shaft or rod, but the center of curvature of the curved lapping surfaces of said sections being out of center with reference to the axis of said shaft or rod, and means for maintaining said sections in assembled relation to encircle the shaft or rod, as and for the purpose set forth.

9. In a metallic packing, the combination with a shaft or rod, of a packing-ring mounted thereon and composed of sections assembled in encircling relation with respect to said shaft or rod, said sections each having a curved bearing-surface concentric with said shaft or rod, and with curved lapping surfaces of equal radius with the curved bearing-surface but eccentric with respect to the shaft or rod, and means for maintaining said sections in assembled relation and for pressing the same into bearing relation with respect to the shaft or rod, as and for the purpose set forth.

10. In a metallic packing, the combination with a shaft or rod, of a packing-ring mounted thereon and composed of sections assembled in encircling relation with respect to said shaft or rod, said sections each having curved bearing-surfaces concentric with said shaft or rod and with curved lapping surfaces and a curved exterior surface, all of said curved surfaces having a radius of curvature equal to the radius of the shaft or rod, a plate mounted upon said rod or shaft, means for laterally pressing the sectional packing-ring against the surface of said plate, and means encircling said ring for maintaining the sections thereof in assembled relation and constantly pressed into bearing contact with the peripheral surface of the rod or shaft, as and for the purpose set forth.

11. In a metallic packing, the combination with a shaft or rod, of a packing-ring mounted thereon and composed of sections assembled in encircling relation with respect to said shaft or rod, said sections each having curved bearing-surfaces concentric with said shaft or rod and with curved lapping surfaces and a curved exterior surface, all of said curved surfaces having a radius of curvature equal to the radius of the shaft or rod, a plate mounted upon said rod or shaft, said plate having interiorly tapered or beveled flanges, an exteriorly tapered or beveled ring arranged to telescope into said flange and in encircling relation with respect to said sectional packing-ring, and means for yieldingly pressing said tapered or beveled ring telescopically into said flange, as and for the purpose set forth.

12. In a metallic packing, the combination with a shaft or rod, of a packing-ring mounted thereon and composed of sections assembled in encircling relation with respect to said shaft or rod, said sections each having curved bearing-surfaces concentric with said shaft or rod and with curved lapping surfaces and a curved exterior surface, all of said curved surfaces having a radius of curvature equal to the radius of the shaft or rod, a plate having an interiorly-beveled flange mounted upon said rod or shaft and arranged to inclose the sectional packing-ring, a clamp ring or sleeve having an exteriorly-beveled surface and all arranged to encircle said sectional packing-ring, and means for pressing said clamp ring or sleeve telescopically into the annular beveled flange of said plate, whereby the sections of the packing-ring are maintained in assembled relation and in encircling relation with respect to the shaft or rod, as and for the purpose set forth.

In witness whereof I have hereunto set my hand, this 18th day of November, 1903, in the presence of the subscribing witnesses.

FREDERICK F. SWAIN.

Witnesses:
   E. C. SEMPLE,
   S. E. DARBY.